United States Patent [19]

Baxter

[11] Patent Number: 5,110,459
[45] Date of Patent: May 5, 1992

[54] SEPTAGE ANAEROBIC TREATMENT BATCH PROCESSING

[75] Inventor: Richard C. Baxter, Moline, Mich.

[73] Assignee: B & B W/W, Inc., Moline, Mich.

[21] Appl. No.: 562,593

[22] Filed: Aug. 3, 1990

[51] Int. Cl.$^5$ .................. B01D 21/30; C02F 3/30
[52] U.S. Cl. .................... 210/143; 210/605; 210/195.1; 210/202; 210/220; 210/259
[58] Field of Search ............ 210/143, 148, 180, 195.1, 210/202, 220, 259, 603, 605

[56] References Cited

U.S. PATENT DOCUMENTS

| | | | |
|---|---|---|---|
| 2,457,057 | 12/1948 | Mallory | 210/8 |
| 2,893,957 | 7/1959 | Gentler et al. | 210/603 |
| 3,386,911 | 6/1968 | Albertson | 210/18 |
| 3,409,545 | 11/1968 | Albertson | 210/5 |
| 3,730,881 | 5/1973 | Armstrong | 210/6 |
| 3,847,803 | 11/1974 | Fisk | 210/605 |
| 3,981,800 | 9/1976 | Ort | 210/603 |
| 4,057,401 | 11/1977 | Boblitz | 210/603 X |
| 4,246,101 | 1/1981 | Selby | 210/143 X |
| 4,511,370 | 4/1985 | Hunziker et al. | 210/603 X |
| 4,710,292 | 12/1987 | DeVos | 210/DIG. 9 X |
| 4,915,840 | 4/1990 | Rozich | 210/605 |

Primary Examiner—Charles Hart
Attorney, Agent, or Firm—Price, Heneveld, Cooper, DeWitt & Litton

[57] ABSTRACT

A sequencing batch waste treatment facility with pretreatment mixing, blending and dilution, with post-treatment liquid effluent recirculation and with anaerobic sludge digestion wherein high biological oxygen demand (BOD) waste is treated and reduced to an acceptable BOD level.

21 Claims, 1 Drawing Sheet

SEPTAGE ANAEROBIC TREATMENT BATCH PROCESSING

BACKGROUND OF THE INVENTION

The present invention generally relates to sewage treatment and specifically to septage, holding tank waste and landfill leachate treatment which cannot be accommodated by typical municipal-type waste treatment facilities.

The Environmental Protection Agency (EPA) and state governments dictate the discharge standards for municipal-type waste treatment facilities. A standard unit of measure used is the biological oxygen demand loading concentration (BOD) given in parts per million (ppm). In Michigan for example, the BOD for the prevalent secondary municipal-type waste treatment facility discharge is limited to 20 to 30 ppm. This mandates a BOD less than 250 ppm in the sanitary sewer supplying the municipal-type waste treatment facility in order to avoid overloading and shocking the treatment facility system.

Waste treatment facilities are designed to accommodate specified volumes of waste at a specified BOD. The mandated BOD maximum of 250 ppm will typically accommodate a residential sanitary sewer system at volumes which do not exceed the design capacity of the municipal-type waste treatment facility. However, municipal-type waste treatment facilities are being pushed to their capabilities as communities grow. In view of this stress, the municipal-type waste treatment facility cannot practically accommodate sources of high concentration waste. These sources of high concentration waste include landfill leachate, septage and holding tank waste.

Leachate and septage are too concentrated for typical municipal-type waste treatment facility processing.

Leachate typically has a BOD of about 5,000 ppm. Septage typically has a BOD of about 3,500 ppm. Holding tank waste presents a different problem of excessive amounts of solid waste, typically up to 40%. A common method of disposal for these high concentration wastes is to simply spread the waste over an open field or farm field. This presents other problems. First, nitrates, common in this waste, quickly filter through the ground, settling into the ground water and presenting a potential ground water pollution problem. Second, even if buried or cultivated into the soil through normal farming activity, solid wastes have a tendency to float up through and surface above the ground. Finally, monitoring and regulating the disposal of heavy metal and toxic wastes is quite difficult with significant ground and water pollution problems resulting.

SUMMARY OF THE INVENTION

The aforementioned problems are addressed and effectively resolved by the present invention which presents a modular approach to process high BOD wastes. Rather than merely discarding high BOD waste across the land or burying it underground, the waste treatment facility of the present invention processes and treats high BOD waste for acceptance by a municipal-type waste treatment facility or for general discharge after complete treatment.

The waste treatment facility of the present invention includes a cell for receiving waste into the facility and pretreating the waste. Waste is received from the pretreatment cell into a water treatment cell for aerobic decomposition. A sludge digestion cell receives sludge from the treatment cell for anaerobic decomposition. Gaseous by-products from the anaerobic decomposition are collected in the digestion cell. The transference of waste into, within and out of the facility is provided for and controls for controlling the operation of the facility are provided.

In one aspect of the invention, the gaseous by-products are used to generate power for the operation of the facility and are used to provide space heating for the facility.

In another aspect of the invention, liquid effluent from the first waste treatment is recycled to pretreat waste received into the facility.

In another aspect of the invention, a plurality of receiving tanks receive waste into the facility and the waste is selectively transferred from a receiving tank into the pretreatment cell.

DESCRIPTION OF THE PREFERRED EMBODIMENT

Figure 2:
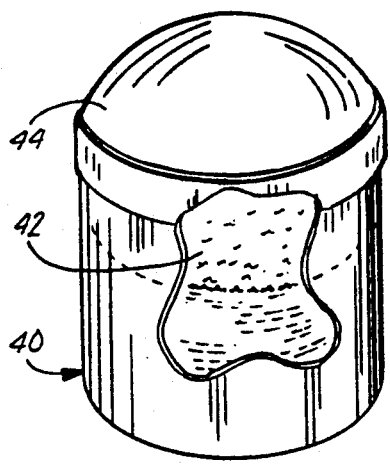
FIG. 2 is a partially cut-away perspective view of the sludge digester cell of the present invention with expandable dome.

Referring now to the drawings in greater detail, the preferred embodiment of the waste treatment facility of the present invention includes receiving and holding tanks 10. A pretreatment cell 20 is provided for receiving a batch of waste from a receiving tank 10 and for pretreating the batch by mixing, blending and dilution prior to further processing in the facility. A bio-mass cell 30 is provided in the facility for bacteria-activated decomposition of a batch of waste received from pretreatment cell 20. Further decomposition of the residual waste sludge, produced by the treatment process of bio-mass cell 30, occurs by an anaerobic process in a sludge digester cell 40. Cell 40 is preferably a gas-tight expansible chamber for collecting gaseous by-products of the anaerobic decomposition. These gaseous by-products are of sufficient fuel quality to fuel a facility space heater 70 and to fuel a power generator 80 for the facility. A liquid effluent holding tank 50 is also provided in the preferred embodiment to receive liquid effluent which is decanted from bio-mass cell 30. Liquid effluent from tank 50 is recycled to pretreatment cell 20, as needed, to dilute subsequent batches. A facility control system 60, preferably a microprocessor based automated system, is used to control the transfer of waste in the facility and the batch process treatment of waste which occurs in each cell of the facility.

In the operation of the facility of the present invention, waste is received as a batch by a receiving and holding tank 10 from a waste hauler. Each batch is analyzed for content and treatment requirements to determine proper treatment. Information regarding the source, treatment requirements and disposition for each batch of waste received is entered into control system 60. If the batch contains non-treatable toxic waste, the batch will be rejected and disposed of via proper toxic waste disposal. An acceptable batch will be transferred via a pump 11 through piping 13 into pretreatment cell 20. The batch will be mixed and blended in cell 20 by a floating mixer 21. Liquid effluent can be added from holding tank 50 via a pump 51 and piping 53 into cell 20 to dilute the batch as required. The batch can also be chemically treated in cell 20. After pretreatment in cell 20, the batch is transferred to bio-mass cell 30 via a pump 23 through piping 25. A bacteria-activated decomposition of the batch occurs in cell 30. Air bubble diffusers 31, preferably coarse air bubble diffusers, and a floating mixer 33 enhance the decomposition. After treatment in cell 30, liquid effluent is decanted from cell 30 via a pump 35 and piping 37 into tank 50. Liquid effluent decanted from cell 30 is of sufficiently low BOD to be received by a municipal-type waste treatment facility or can be of sufficiently low BOD to satisfy National Discharge Pollution Elimination System (NDPES) permit standards for general discharge after extended treatment in cell 30. Fine air bubble diffusers 55 are used in tank 50 to maintain or enhance the condition of the liquid effluent held in tank 50. The liquid effluent held in tank 50 can be recycled back to cell 20 via pump 51 and piping 53 as is required for the dilution and pretreatment of subsequent batches. The liquid effluent which is not recycled from tank 50 to cell 20 can be discharged from the facility via a pump 57 and piping 59. This discharge of liquid effluent from the facility ca take place during the off-peak usage time periods for a receiving municipal-type waste treatment facility or as a NDPES permit specifies for general discharge.

Residual sludge is transferred from cell 30 to sludge digester cell 40 via a pump 32 and piping 34. As shown in FIG. 2, and alternatively in FIG. 3, sludge digester cell 40 is a gas-tight, expansible chamber in which an anaerobic sludge digesting process occurs.

Figure 3:
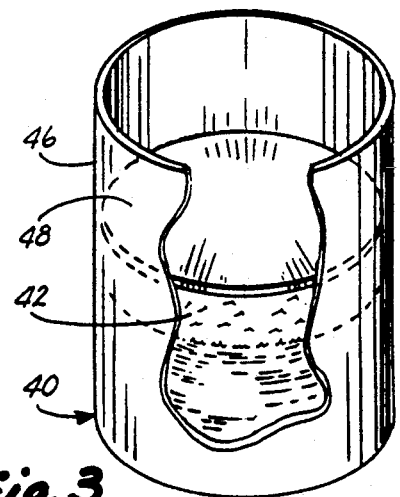
FIG. 3 is a partially cut-away perspective view of the sludge digester cell of the present invention in an alternative, floating lid embodiment.

The waste treatment facility of the present invention is preferably contained within a facility building and cell 40 preferably has an expandable dome 44, a resilient gas-tight, balloon-like membrane or the like to form an expansible chamber for collecting gaseous by-products. In an alternative embodiment, cell 40 can be a rigid, floating lid chamber. As shown in FIG. 3, the floating lid chamber includes a cylindrical cell 46 with a floating disc-like lid 48 which moves up and down in the cylindrical chamber, piston-like, floating upon the contents of the chamber.

The anaerobic process further reduces waste sludge from cell 30, producing stabilized sludge, liquid effluent and gaseous by-products. These gaseous by-products form, collect and generate pressure at 42 within cell 40. The gaseous by-products are combustible, generally consisting of methane, and are of sufficient fuel quality that they can be used to fuel the facility space heater 70 and to fuel power generator 80 for the operation of the facility. The pressure generated within cell 40 is sufficiently high that the gaseous by-products are ducted through piping 49 to the space heater 70 and power generator 80 without supplemental transfer or pumping means.

Figure 1:
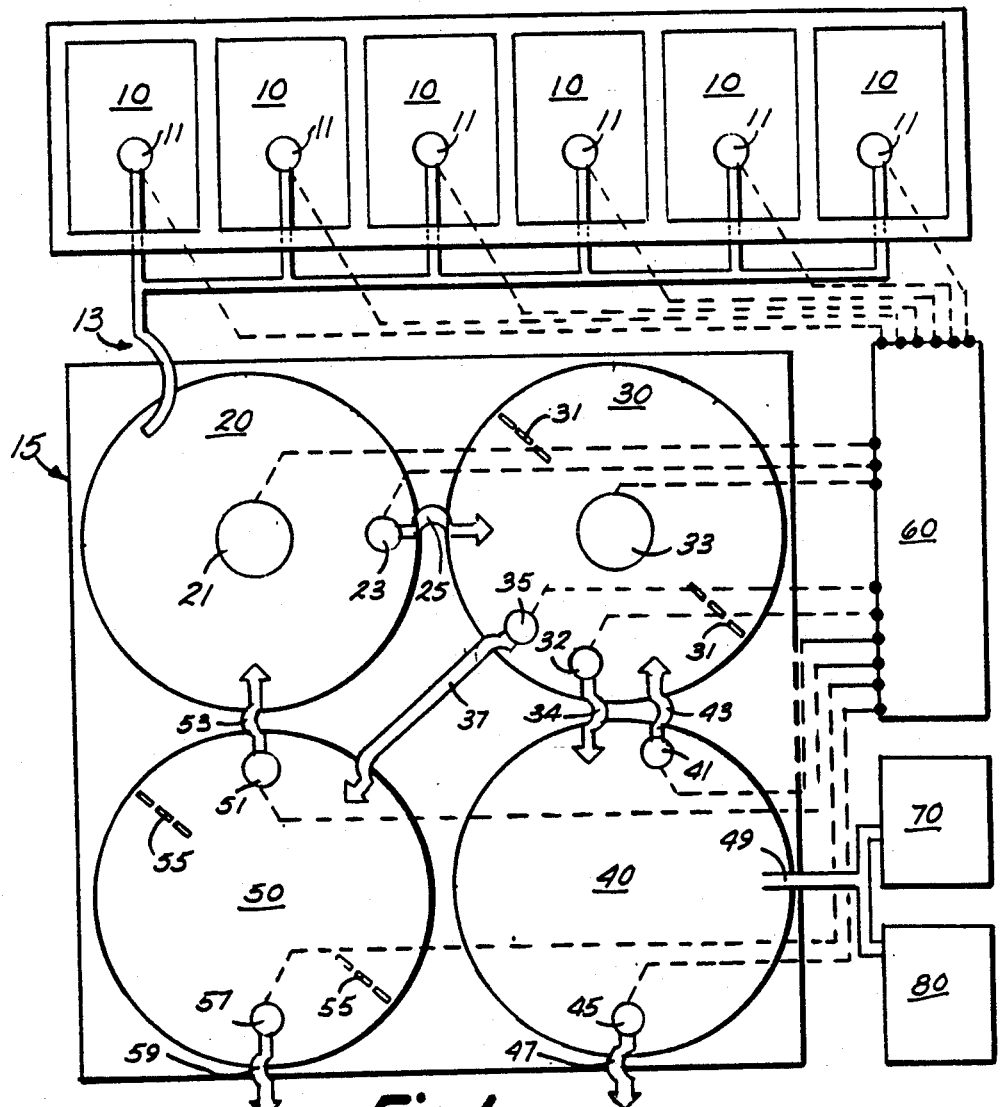
FIG. 1 is a schematic drawing, representing the waste treatment facility of the present invention.

Again referring to FIG. 1, liquid effluent, separated in cell 40, is decanted from cell 40 to cell 30 via a pump 41 and piping 43. Stabilized sludge from cell 40 is discharged from the facility via a pump 45 and piping 47 for proper sludge disposal.

The waste treatment facility of the present invention is preferably equipped with a ducting system whereby fumes and odors normally associated with the waste treatment are captured and filtered. Because of the modular nature of the waste treatment facility of the present invention, its capacity is easily expanded by the addition of cells to increase capacity. Further, as the cell walls 15 are not penetrated by any piping (14, 24, 33, 34, 43, 44, 53 and 54), the cell functions and associated piping are easily rearranged to accommodate future changes or expansions.

The above description is considered that of the preferred embodiment only. Modifications of the invention will occur to those who make or use the invention. Therefore, it is understood that the embodiment shown in the drawings and described above is merely for illustrative purposes and is not intended to limit the scope of the invention, which is defined by the following claims as interpreted according to the principles of patent law, including the doctrine of equivalents.

The embodiments of the invention in which an exclusive property or privilege is claimed are defined as follows.

1. A waste treatment facility comprising:
 a waste pretreatment cell for receiving waste into said facility and for pretreating said waste by blending solid and liquid components of the waste together and by dilution with treated liquid effluent;
 a waste treatment cell for receiving pretreated waste from said waste pretreatment cell and for aerobic treatment of the waste after pretreatment in said waste pretreatment cell;
 a sludge digester cell for receiving sludge from said treatment cell for anaerobic treatment of said sludge and for collecting gaseous by-products;
 a plurality of transfer means in fluid communication with said cells for transferring the contents of said cells; and
 control means for controlling the operation of said facility.

2. The facility of claim 1 further including:
 a heating means, fueled by said gaseous by-products, for providing space heating to said facility;
 a power generating means, fueled by said gaseous by-products, for generating power to operate said facility; and
 transfer means in fluid communication between said sludge digester cell and said heating and power generating means for transferring said gaseous by-products to said heating and power generating means.

3. The facility of claim 1 further including a plurality of tanks for receiving waste into said facility and transfer means in fluid communication between said tanks and said waste pretreatment cell for selectively transferring waste from at least one of said plurality of tanks to said waste pretreatment cell.

4. The facility of claim 1 further including a liquid effluent holding tank for receiving liquid effluent form said waste treatment cell and an oxygenation means in said liquid effluent holding tank for oxygenating said liquid effluent.

5. The facility of claim 1 wherein said waste pretreatment cell includes first mixing means for mixing the contents of said waste pretreatment cell.

6. The facility of claim 1 wherein said waste treatment cell includes at least one of bacteria decomposition mans for bacteria decomposition of waste contained in said waste treatment cell, oxygenation means for supplying oxygen into said waste treatment cell, and second mixing means for mixing waste contained in said waste treatment cell.

7. The facility of claim 1 wherein said sludge digester cell comprises a gas-tight expansible chamber and anaerobic decomposition means within said chamber for anaerobic decomposition of waste sludge, so that gases produced by said anaerobic decomposition means are contained by said cell.

8. The facility of claim 1 wherein:
one of said transfer means is in fluid communication between said waste pretreatment cell and said waste treatment cell for transferring the contents of said waste pretreatment cell into said waste treatment cell;
one of said transfer means is in fluid communication between said waste treatment cell and said sludge digester cell for transferring sludge from said waste treatment cell into said sludge digester cell;
one of said transfer means is in fluid communication between said sludge digester cell and said waste treatment cell for transferring liquid effluent from said sludge digester cell into said waste treatment cell;
one of said transfer means is in fluid communication with said sludge digester cell for transferring sludge out of said sludge digester cell for discharge form said facility;
one of said transfer means is in fluid communication with said sludge digester cell and transfers said gaseous by-products out of said sludge digester cell; and
one of said transfer means is in fluid communication with said waste treatment cell for transferring liquid effluent from said waste treatment cell.

9. A waste treatment facility comprising:
at least one waste receiving tank for receiving waste into said facility;
a pretreatment cell for receiving waste form a waste receiving tank and for pretreating said waste;
a waste treatment cell for receiving waste from said pretreatment cell and for aerobic treatment of said waste;
a liquid effluent holding tank, including oxygenating means, for receiving liquid effluent from said waste treatment cell;
a sludge digester cell for receiving sludge from said waste treatment cell, for anaerobic treatment of said sludge and for collecting gaseous by-products;
a plurality of transfer means in fluid communication with said tanks and said cells for transferring the contents of said tanks and cells; and
control means for controlling the operation of said facility.

10. The facility of claim 9 further including:
a heating means, fueled by said gaseous by-products, for providing space heating to said facility;
a power generating means, fueled by said gaseous by-products, for generating power to operate said facility; and
transfer means in fluid communication between said sludge digester cell and said heating and power generating means for transferring said gaseous by-products to said heating and power generating means.

11. The facility of claim 9 wherein said pretreatment cell includes a means for mixing the contents of said cell.

12. The facility of claim 9 wherein said waste treatment cell includes at least one of bacteria decomposition means for bacteria decomposition of waste contained in said waste treatment cell, oxygenation means for supplying oxygen into said waste treatment cell, and mixing means for mixing waste contained in said waste treatment cell.

13. The facility of claim 9 wherein said sludge digester cell comprises a gas-tight expansible chamber and anaerobic decomposition means within said chamber for anaerobic decomposition of waste sludge, so that gases produced by said anaerobic decomposition means are contained by said cell.

14. The facility of claim 9 wherein:
one of said transfer means is in fluid communication between each said waste receiving tank and said pretreatment cell for selectively transferring the contents of each said waste receiving tank into said pretreatment cell;
one of said transfer means is in fluid communication between said liquid effluent holding tank and said pretreatment cell for transferring liquid effluent from said liquid effluent holding tank into said pretreatment cell;
one of said transfer means is in fluid communication between said pretreatment cell and said waste treatment cell for transferring the contents of said pretreatment cell into said waste treatment cell;
one of said transfer means is in fluid communication between said waste treatment cell and said sludge digester cell for transferring sludge from said waste treatment cell into said sludge digester cell;
one of said transfer means is in fluid communication between said waste treatment cell and said liquid effluent holding tank for transferring liquid effluent from said waste treatment cell into said liquid effluent holding tank;
one of said transfer means is in fluid communication between said sludge digester cell and said waste treatment cell for transferring liquid effluent from said sludge digester cell into said waste treatment cell;
one of said transfer means is in fluid communication with said sludge digester cell for transferring sludge out of said sludge digester cell to discharge said sludge from said facility;
one of said transfer means is in fluid communication with said liquid effluent holding tank for transferring liquid effluent out of said liquid effluent holding tank to discharge said effluent from said facility; and
one of said transfer means is in fluid communication with said sludge digester cell for transferring said gaseous by-products form said sludge digester cell.

15. A waste treatment facility comprising:
means for receiving waste into said facility;
means for pretreating said waste;
means for aerobic waste decomposition;
means for accumulating liquid effluent;
means for anaerobic waste decomposition including means for collecting gaseous by-products;
means for using said gaseous by-products to heat said facility;
means for using said gaseous by-products to generate power to operate said facility;
means for transferring said waste between above said means; and
means for controlling the operation of said facility.

16. The facility of claim 15 wherein said means for receiving is a plurality of tank.

17. The facility of claim 15 wherein said means for pretreating is a cell including means for mixing and blending waste.

18. The facility of claim 15 wherein said means for accumulating is a tank including oxygenating means.

19. The facility of claim 15 wherein said means for aerobic waste decomposition is a cell including at least one of a bacteria decomposition means, an oxygenating means and a waste mixing means.

20. The facility of claim 15 wherein said means for anaerobic waste decomposition is a gas-tight, expansible chamber containing anaerobic decomposition means for anaerobic decomposition of waste sludge, said expansible chamber confining gaseous by-products of said anaerobic decomposition means.

21. The facility of claim 15 wherein:
one of said transfer means is in fluid communication between said means for receiving waste and said means for pretreating for selectively transferring the contents of said means for receiving waste into said means for pretreating;
one of said transfer means is in fluid communication between said means for pretreating and said means for aerobic waste decomposition for transferring the contents of said means for pretreating into said means for aerobic decomposition;
one of said transfer means is in fluid communication between said means for aerobic waste decomposition and said means for anaerobic waste decomposition for transferring sludge form the first said means into the second said means;
one of said transfer means is in fluid communication with said means for anaerobic waste decomposition for transferring sludge out of said means to discharge said sludge form said facility;
one of said transfer means is in fluid communication with said means for anaerobic waste decomposition for transferring said gases from said means to said heating means and to said power generating means;
one of said transfer means is in fluid communication between said means for anaerobic waste decomposition and said means for aerobic waste decomposition for transferring liquid effluent from the first said means into the second said means;
one of said transfer means is in fluid communication between said means for aerobic decomposition means and said means for accumulating liquid effluent for transferring liquid effluent from the first said means into the second said means;
one of said transfer means is in fluid communication with said means for accumulating liquid effluent for transferring liquid effluent out of said means to discharge said effluent form said facility; and
one of said transfer means is in fluid communication with said means for accumulating liquid effluent and said means for pretreating waste for transferring liquid effluent from the first said means into the second said means.

* * * * *

UNITED STATES PATENT AND TRADEMARK OFFICE
CERTIFICATE OF CORRECTION

PATENT NO. : 5,110,459

DATED : May 5, 1992

INVENTOR(S) : Richard C. Baxter

It is certified that error appears in the above-identified patent and that said Letters Patent is hereby corrected as shown below:

Column 3, line 28;
    "ca take" should be --can take--.

Column 4, line 57;
    "form" should be --from--.

Column 4, line 66;
    "mans" should be --means--.

Column 5, line 38;
    "form" should be --from--.

Column 5, line 66;
    "includes-a-means" should be --includes means--.

Column 6, line 54;
    "form" should be --from--.

Column 8, line 1;
    "form" should be --from--.

UNITED STATES PATENT AND TRADEMARK OFFICE
CERTIFICATE OF CORRECTION

PATENT NO.  : 5,110,459

DATED       : May 5, 1992

INVENTOR(S) : Richard C. Baxter

It is certified that error appears in the above-identified patent and that said Letters Patent is hereby corrected as shown below:

Column 8, line 6;
    "form" should be --from--.

Column 8, line 24;
    "form" should be --from--.

Signed and Sealed this

Twenty-sixth Day of October, 1993

Attest:

BRUCE LEHMAN

Attesting Officer     Commissioner of Patents and Trademarks